United States Patent
Wilbert et al.

(10) Patent No.: US 10,375,882 B2
(45) Date of Patent: Aug. 13, 2019

(54) MULTI-SECTIONAL HEADER FRAME

(71) Applicant: CNH Industrial America LLC, New Holland, PA (US)

(72) Inventors: Andrew R. Wilbert, Walworth, NY (US); Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 6 days.

(21) Appl. No.: 15/491,688

(22) Filed: Apr. 19, 2017

(65) Prior Publication Data

US 2018/0303029 A1    Oct. 25, 2018

(51) Int. Cl.
| | | |
|---|---|---|
| *A01D 34/86* | (2006.01) | |
| *A01D 34/04* | (2006.01) | |
| *A01D 41/14* | (2006.01) | |
| *A01D 101/00* | (2006.01) | |

(52) U.S. Cl.
CPC ............ *A01D 34/86* (2013.01); *A01D 34/04* (2013.01); *A01D 41/14* (2013.01); *A01D 2101/00* (2013.01)

(58) Field of Classification Search
CPC .... A01D 34/86; A01D 34/04; A01D 2101/00; A01D 34/661; A01D 41/144; A01D 34/66; A01D 78/1014; A01B 73/042; A01B 73/06
See application file for complete search history.

(56) References Cited

U.S. PATENT DOCUMENTS

| | | | |
|---|---|---|---|
| 3,783,594 A | | 1/1974 | Watt et al. |
| 4,070,123 A | * | 1/1978 | Willingshofer ........ B60G 7/005 280/124.155 |
| 4,409,780 A | | 10/1983 | Beougher |
| 4,769,976 A | * | 9/1988 | Bassett .................. A01D 75/30 56/249 |
| 4,956,966 A | | 9/1990 | Patterson |
| 5,107,663 A | * | 4/1992 | Wattron ............... A01D 34/661 56/15.7 |
| 5,177,942 A | * | 1/1993 | Hager .................. A01D 34/662 56/11.6 |
| 5,353,579 A | * | 10/1994 | Wolff ..................... A01B 61/04 56/15.2 |
| 5,697,723 A | * | 12/1997 | Wood .................. F16C 11/0638 403/122 |
| 5,771,669 A | | 6/1998 | Langworthy et al. |
| 6,065,274 A | * | 5/2000 | Laskowski ............. A01D 34/76 56/11.6 |
| 6,109,012 A | * | 8/2000 | Staal .................. A01D 78/1014 172/311 |

(Continued)

FOREIGN PATENT DOCUMENTS

DE    202014002808 U1 *  7/2015   .......... A01D 34/661

*Primary Examiner* — Arpad Fabian-Kovacs
(74) *Attorney, Agent, or Firm* — Peter K. Zacharias; Patrick M. Sheldrake

(57) ABSTRACT

A header for an agricultural harvester comprising a first frame assembly and a second frame assembly is disclosed. The first frame assembly supports a first cutter bar segments and extends widthwise across the header. The second frame assembly supports a second cutter bar segment and is connected to the first frame assembly such that second frame assembly is movable relative to the first frame assembly about three rotational degrees of freedom.

20 Claims, 6 Drawing Sheets

(56) References Cited

U.S. PATENT DOCUMENTS

| | | | |
|---|---|---|---|
| 6,497,086 B2 * | 12/2002 | Bergsten | A01D 34/81 56/14.7 |
| 6,655,118 B1 * | 12/2003 | Thompson | A01D 43/107 56/15.8 |
| 6,675,568 B2 | 1/2004 | Patterson et al. | |
| 7,726,109 B2 * | 6/2010 | Thompson | A01D 34/661 56/15.8 |
| 7,992,372 B1 * | 8/2011 | Coers | A01D 41/14 56/153 |
| 8,087,224 B1 * | 1/2012 | Coers | A01D 41/144 56/153 |
| 8,151,547 B2 | 4/2012 | Bich et al. | |
| 8,261,521 B2 | 9/2012 | Thompson | |
| 8,347,594 B1 * | 1/2013 | Lovett | A01D 41/14 56/296 |
| 8,528,308 B2 | 9/2013 | Priepke | |
| 8,635,842 B2 | 1/2014 | Markt | |
| 9,072,222 B2 | 7/2015 | Bomleny et al. | |
| 9,173,345 B2 * | 11/2015 | Cressoni | A01D 45/021 |
| 9,526,206 B2 | 12/2016 | Schulze Ruckamp et al. | |
| 9,541,124 B2 * | 1/2017 | Graber | F16C 11/0647 |
| 9,877,423 B2 * | 1/2018 | Billard | A01B 73/042 |
| 2002/0108363 A1 * | 8/2002 | Bergsten | A01D 34/81 56/16.7 |
| 2003/0182912 A1 * | 10/2003 | Boll | A01D 34/661 56/14.7 |
| 2009/0107096 A1 * | 4/2009 | Thompson | A01B 73/065 56/15.5 |
| 2011/0209453 A1 * | 9/2011 | Neudorf | A01D 34/661 56/15.2 |
| 2015/0373907 A1 * | 12/2015 | Schulze Ruckamp | A01D 41/16 56/246 |
| 2017/0094904 A1 * | 4/2017 | Sudhues | A01D 41/144 |

* cited by examiner

MULTI-SECTIONAL HEADER FRAME

The present invention relates generally to a header of a plant cutting machine (e.g., a combine harvester) and, more specifically, to a header having multiple frame sections.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism for severing the plants or crops, such as an elongate sickle mechanism that reciprocates sidewardly relative to a non-reciprocating guard structure or a row unit with gathering chains and deck plates.

A larger/wider header allows for faster crop field clearing. However, the larger a header is, the more difficult it becomes to maintain efficient crop gathering because the lateral edges of the header flex as the edges experience changes in terrain, e.g., elevation. The flexing creates unnecessary strain on the header and cutting mechanism if not properly accounted for. Additionally, changes in elevation cause crop to go to waste if such flexing causes the cutting mechanism to cut above the stalk of the crop.

One attempt to improve header design is disclosed in U.S. Pat. No. 9,526,206 which discloses a header having a central section and a lateral section that is constrained to pivot about a single axis in a single direction of motion. However, such a design still fails to account, e.g., for changes in terrain that differ between opposing lateral sections of the central section.

Therefore, what is desired is a header that is capable of accommodating for changes in terrain and/or elevation while still maintaining efficient crop gathering. When the disclosed invention is used in combination with an agricultural harvester, the invention overcomes one more of the disadvantages of conventional headers by providing a header having multiple sections, i.e., frame sections or assemblies, which can flex and rotate in three rotational degrees of freedom to track changes in terrain.

BRIEF SUMMARY OF THE INVENTION

The present invention provides a multi-sectional header for an agricultural harvester.

In accordance with an exemplary embodiment of the present invention, there is provided a header for an agricultural harvester comprising a first frame assembly supporting a first cutter bar segment and a second frame assembly. The first frame assembly extends widthwise across the header. The second frame assembly is connected to the first frame assembly and movable relative to the first frame assembly about three rotational degrees of freedom.

An aspect of the exemplary embodiment of the present invention is that the second frame assembly is connected to the first frame assembly about a first point spaced laterally away from the first frame assembly. Additionally, the second frame assembly is movable about the first point in three rotational degrees of freedom relative to the first frame assembly. Furthermore, the second frame assembly is movable relative to the first frame assembly in only three rotational degrees of freedom.

Another aspect of the exemplary embodiment of the present invention is that the header further comprises a biasing member that limits a movement of the second frame assembly relative to the first frame assembly about one rotational degree of freedom. The header further comprises a stop member that limits a rotational movement of the second frame assembly between a first position and a second position. Additionally, the stop member extends laterally from the first frame assembly.

Another aspect of the exemplary embodiment of the present invention is that the first frame assembly includes one of a male joint member and a female joint member, and the second frame assembly includes the other of the male joint member and the female joint member. The male and female joint members connect the second frame assembly to the first frame assembly. The male joint member is a rounded head and the female joint member is a concave cavity. Additionally, the first frame assembly is connected to the second frame assembly via a ball and socket joint. Furthermore, the first frame assembly includes a laterally extending first support member that includes a pivoting connection that connects the second frame assembly to the first frame assembly.

Another aspect of the exemplary embodiment of the present invention is that the header further comprises a first actuator engaging the first frame assembly for moving the first frame assembly between a first position and a second position. Additionally, the header further comprises a second actuator engaging the second frame assembly for moving the second frame assembly between a first position and a second position. The second actuator pivots the second frame assembly relative to the first frame assembly between the first and second positions in one of a roll, yaw and pitch direction.

Another aspect of the exemplary embodiment of the present invention is that the header further comprises a third frame assembly supporting a third cutter bar segment, wherein the third frame assembly is connected to the first frame assembly and movable relative to the first frame assembly about three rotational degrees of freedom. The third frame assembly is connected to the first frame assembly about a second point spaced laterally away from the first frame assembly and the second frame assembly. The third frame assembly is movable about the second point in three rotational degrees of freedom relative to the first frame assembly.

Another aspect of the exemplary embodiment of the present invention is that the first frame assembly includes one of a male joint member and a female joint member, and the third frame assembly includes the other of the male joint member and the female joint member. The male and female joint members connect the third frame assembly to the first frame assembly. Additionally, the first frame assembly includes a laterally extending second support member that includes a pivoting connection that connects the third frame assembly to the first frame assembly.

Another aspect of the exemplary embodiment of the present invention is that the header further comprises a third actuator engaging the third frame assembly for moving the third frame assembly between a first position and a second position. The third actuator pivots the third frame assembly relative to the first frame assembly between the first and second positions in one of a roll, yaw and pitch direction.

Other features and advantages of the present invention will be apparent from the following more detail description of the exemplary embodiments of the present invention.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

DETAILED DESCRIPTION OF THE INVENTION

Figure 1:
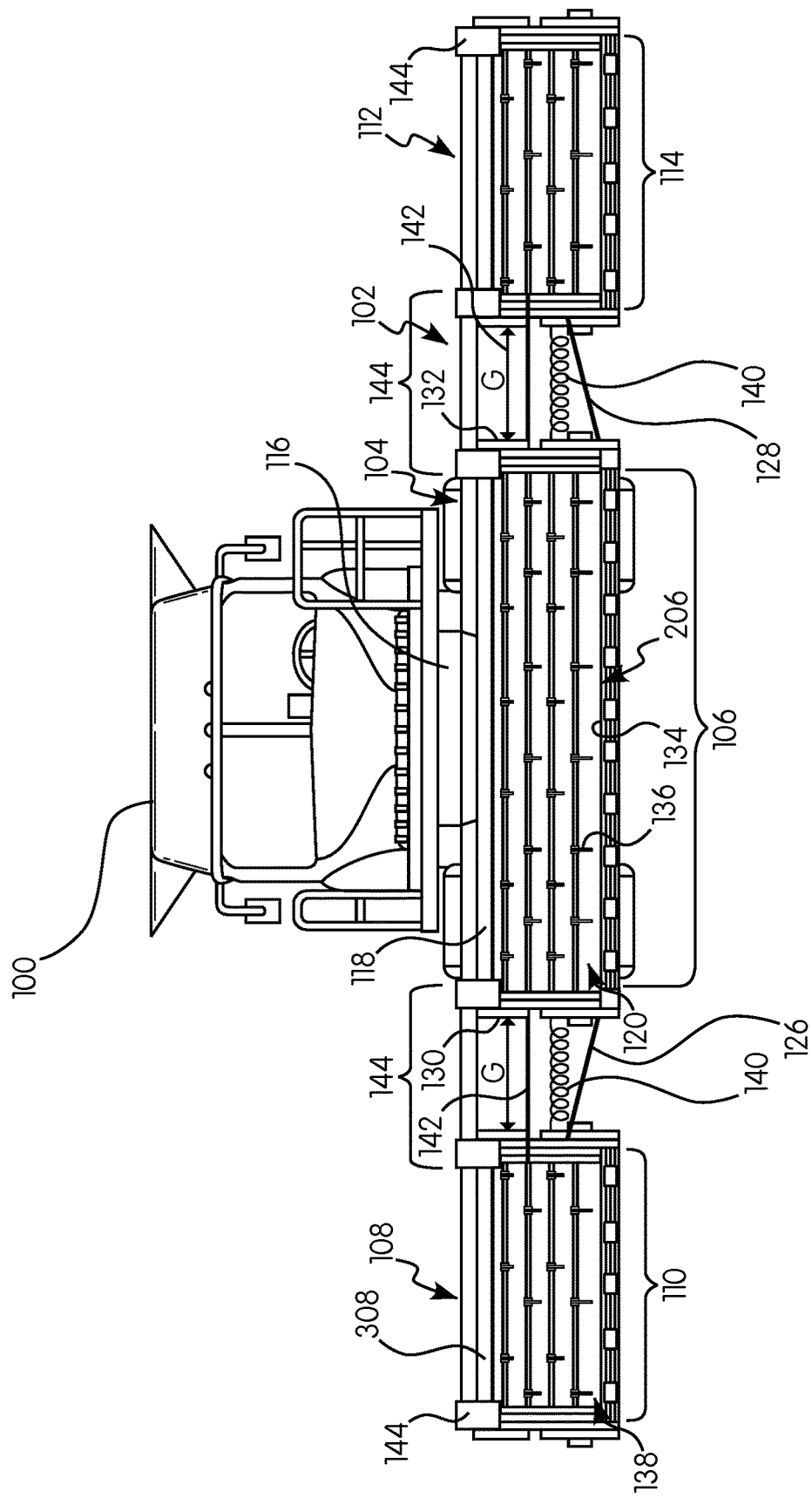
FIG. 1 is a front elevation view of an agricultural harvester including a header in accordance with an exemplary embodiment of the present invention.

Reference will now be made in detail to the various embodiments of the present invention illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present invention in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Referring now to the drawings, wherein aspects of the subject application are shown, FIGS. 1-4C illustrate an agricultural harvester 100 having a header 102 in accordance with an exemplary embodiment of the present invention. The header 102 is a multi-sectional header comprising a first frame assembly 104 supporting a first cutter bar segment 106 and extending widthwise across the header 102, a second frame assembly 108 supporting a second cutter bar segment 110 connected to the first frame assembly 104 and movable relative to the first frame assembly 104 about three rotational degrees of freedom, and a third frame assembly 112 supporting a third cutter bar segment 114 connected to the first frame assembly 104 and movable relative to the first frame assembly 104 about three rotational degrees of freedom.

It is appreciated that the second and third assemblies 108, 112 are structurally substantially similar to each other. Therefore, for convenience purposes only, aspects of the exemplary embodiment may be described in reference to only the second frame assembly 108. It is appreciated that teachings with respect to the second frame assembly 108 are equally applicable to the third frame assembly 112. However, it is also appreciated that the second and third frame assemblies 108,112 need not be identical and can be configured differently from each other in ways known in the art. Additionally, it is also appreciated that FIGS. 1-4C are not drawn to scale. Specifically, although FIG. 1 discloses a gap G between the first, second and third frame assemblies 104, 108, 112, the gap G is preferably configured to be of a minimalized gap distance. The gap G of FIGS. 1-4C is provided to clearly show the parts between the frame assemblies. In other words, the gap G may be as large or a small as necessary for the function of the disclosed invention.

Figure 2:
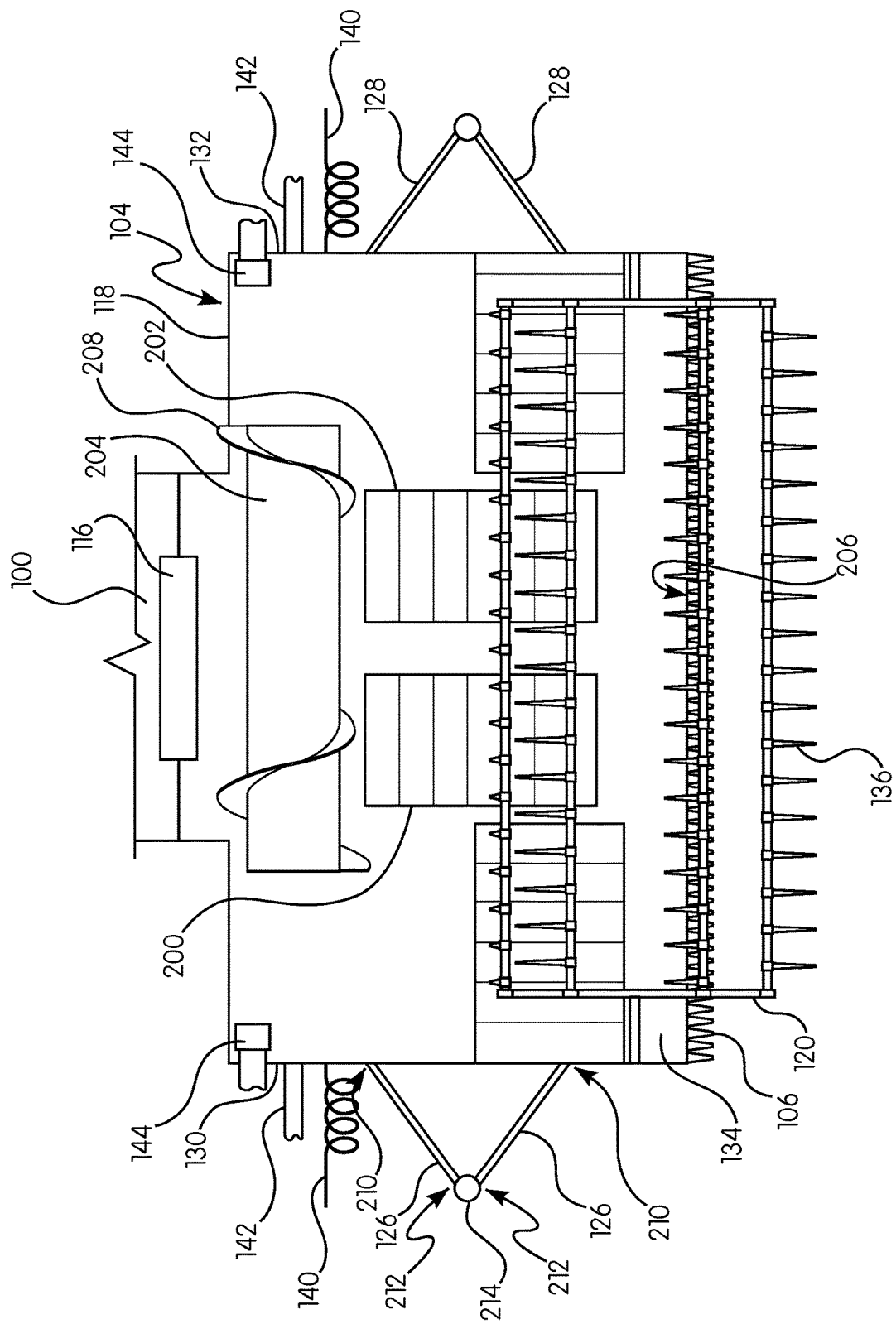
FIG. 2 is a top schematic view of a first frame assembly of the header of FIG. 1 in accordance with an aspect of the exemplary embodiment of the present invention.

Referring now to FIGS. 1 and 2, the first frame assembly 104 is operatively connected to a forward end of the harvester 100. The first frame assembly 104 is configured to cut crops, including (without limitation) small grains (e.g., wheat, soybeans, grain, etc.), and to induct the cut crops into a feederhouse 116 as the harvester 100 moves forward over a crop field.

The first frame assembly 104 is configured substantially as shown in FIG. 2. Specifically, the first frame assembly 104 includes a chassis, i.e., a frame 118, the cutter bar segment 106, a rotatable reel 120, first and second lateral draper belts 122, 124, first and second infeed draper belts 200, 202, a rotatable auger 204, and first and second support members 126, 128.

The frame 118 of the first frame assembly 104 allows for the various components of the first frame assembly 104 to be attached thereto. The frame 118 includes a first side edge 130 and an opposing second side edge 132 adjacent to a floor 134 of the first frame assembly 104. The first and second side edges 130, 132 have an aperture sized to allow the passage of cut crops and/or a draper belt therethrough.

The first cutter bar segment 106 extends transversely along a forward edge 206 of the floor 134 i.e., in a widthwise direction of the harvester 100. The first cutter bar segment 106 is generally bounded by the first and second side edge 130, 132 and is configured to cut crops in preparation for induction into the feederhouse 116. In an exemplary embodiment, the first cutter bar segment 106 includes two independently oscillating cutting assemblies. The mechanisms of such cutting assemblies applicable to the present invention are disclosed in U.S. Pat. No. 8,151,547, the entire disclosure of which is incorporated herein by reference for all purposes. Such cutter bar segments 106 can be driven via drive units, i.e., wobble boxes, located at about the first and second side edges 130, 132 or centrally driven via a center knife drive in ways known in the art.

The rotatable reel 120 is an elongated and rotatable cylindrical member, or series of members, rotatably attached to the side edges 130, 132. The rotatable reel 120 includes tines 136 or other components extending therefrom configured to grasp and release the crops. The rotatable reel 120 hangs above and extends parallel to the first cutter bar segments 106 and is rotatable in a direction suitable for facilitating the induction of cut crops onto the draper belts 122, 124, 200, 202.

The first and second lateral draper belts 122, 124 and the first and second infeed draper belts 200, 202 are conveyor belts having endless webs extending around and between rotatable cylinders. The draper belts 122, 124, 200, 202 extend along the floor 134 and near the first cutter bar segment 106. The first and second infeed draper belts 200, 202 extend in a direction transverse to the first cutter bar segment 106 and towards the feederhouse 116. The first and second lateral draper belts 122, 124 extend up to the apertures in the first and second edge 130, 132, respectfully, and in a direction substantially parallel to the cutter bar segments 106, 110, 114.

However, it is appreciated that the first and second lateral draper belts 122, 124 can extend through the apertures of the first and second edges 130, 132, respectively, towards the second and third frame assemblies 108, 112. In other words, the first lateral draper belt 122 can extend from a rotatable cylinder in the first frame assembly 104 to a rotatable cylinder in the second frame assembly 108, and the second lateral draper belt 124 can extend from a rotatable cylinder in the first frame assembly 104 to a rotatable cylinder in the third frame assembly 112.

The draper belts 122, 124, 200, 202 are configured to rotate in a direction facilitating the induction of cut crops to the feederhouse 116. Specifically, the first and second lateral draper belts 122, 124 are configured to rotate towards a center of the first frame assembly 104 and the infeed draper belts 200, 202. The infeed draper belts 200, 202 are configured to rotate towards the rotatable auger 204 and/or feederhouse 116.

The rotatable auger 204, also known as a screw conveyor, is an elongated cylinder having a flight 208 circumscribing the elongated cylinder along its length. The rotatable auger 204 extends substantially parallel to the first cutter bar segment 106 and is configured to cooperate with the infeed draper belts 200, 202 to convey cut crops to the feederhouse 116. Such rotatable augers are well known in the art and do not necessitate additional discussion for the purposes of the present exemplary embodiments.

The first and second support members 126, 128 are configured substantially as shown in FIGS. 1 and 2. Specifically, the support members 126, 128 are elongated members, each having a proximal end 210 and a distal end 212, extending away from the first frame assembly 104. In an exemplary embodiment, the proximal end 210 is rigidly connected to a bottom side of the floor 134 of the first frame assembly 104. However, it is appreciated that the proximal end 210 can be connected to other parts of the frame 118 of the first frame assembly 104 including, for example, the side edges 130, 132.

The distal end 212 of each of the first and second support members 126, 128 is configured to pivotally connect to one of the second and third frame assemblies 108, 112. In the exemplary embodiment, the distal end 212 has a rounded head 214, i.e., a male joint member, configured to engage the second and third frame assemblies 108, 112 at a point substantially central to and below floors of the second and third frame assemblies or at other suitable locations on the second and third frame assemblies. Additionally, the rounded head 214 may include a bearing or outer layer surrounding the rounded head 214. The bearing may be a round roller bearing circumscribing the rounded head 214. The outer layer may be a flexible material, like a polymer, e.g., an elastomer, for absorbing forces on the rounded head 214 or other components intended to lubricate or facilitate pivoting motion about the rounded head 214.

In the exemplary embodiment, the support members 126, 128 are each formed from two laterally extending members, e.g., trusses, converging at a single point, i.e., the distal end 212. It is appreciated that the support members 126, 128 can be formed via any number of laterally extending members, including 1, 2, 3, 4, 5 and so forth, so long as the laterally extending members converge at a single distal end 212 to create a pivoting connection with the second and third frame assemblies 108, 112. Additionally, it is appreciated that the support members 126, 128 are sufficiently strong enough to support the second and third frame assemblies 108, 112 and are made out of e.g., steel.

In other words, the first frame assembly 104 includes a laterally extending first support member 126 that includes a pivoting connection that connects the second frame assembly 108 to the first frame assembly 104. Further, the second frame assembly 108 is connected to the first frame assembly 104 about a first point, i.e., the distal end 212 of the first support member 126, spaced laterally away from the first frame assembly 104. Additionally, the first frame assembly 104 includes a laterally extending second support member 128 that includes a pivoting connection that connects the third frame assembly 112 to the first frame assembly 104. Furthermore, the third frame assembly 112 is connected to the first frame assembly 104 about a second point, i.e., the distal end of the second support member 128, spaced laterally away from the first frame assembly 104 and the second frame assembly 108.

Referring now to FIGS. 1 and 3-4C, the second frame assembly 108 is configured substantially as shown. The second frame assembly 108 includes a frame 308, the second cutter bar segment 110, a rotatable reel 138, a lateral draper belt 306 and a receiving member 300. In the exemplary embodiment, the frame 308, the second cutter bar segment 110, the rotatable reel 138 and the lateral draper belt 306 of the second frame assembly 108 are structurally similar to the frame 118, the first cutter bar segment 106, the rotatable reel 120 and the first lateral draper belt 122 of the first frame assembly 104, respectfully. Additionally, the first lateral draper belt 122 can extend from the first frame assembly 104 and take the place of the lateral draper belt 306 of the second frame assembly 108. Thus, the second cutter bar segment 110, the rotatable reel 138, and the lateral draper belt 306 do not necessitate additional discussion for the purposes of the present exemplary embodiment.

Figure 3:
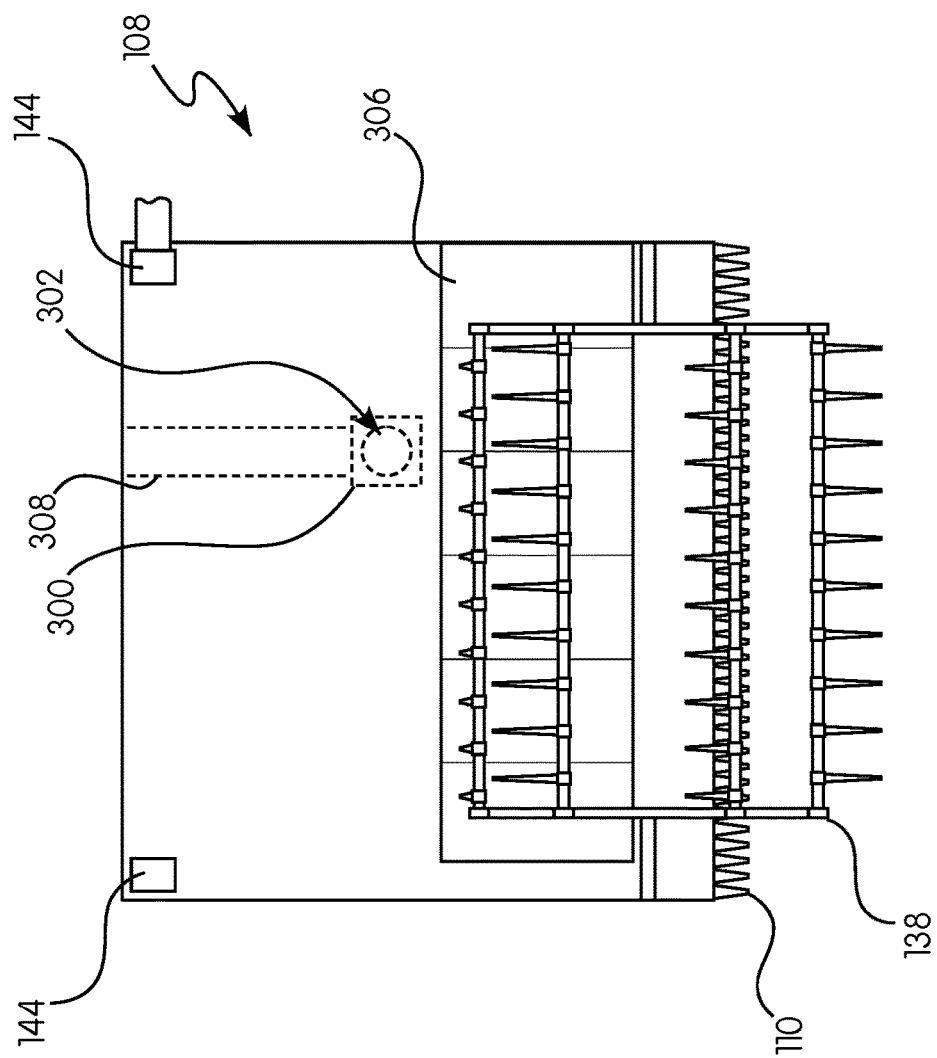
FIG. 3 is a top schematic view of a second frame assembly of the header of FIG. 1 in accordance with an aspect of the exemplary embodiment of the present invention.
Figure 3A:
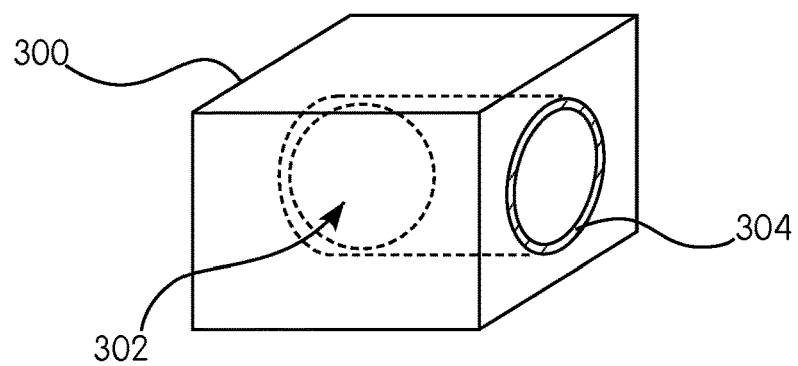
FIG. 3A is a perspective view of a receiving member in accordance with an aspect of the exemplary embodiment of the present invention.
Figure 3B:
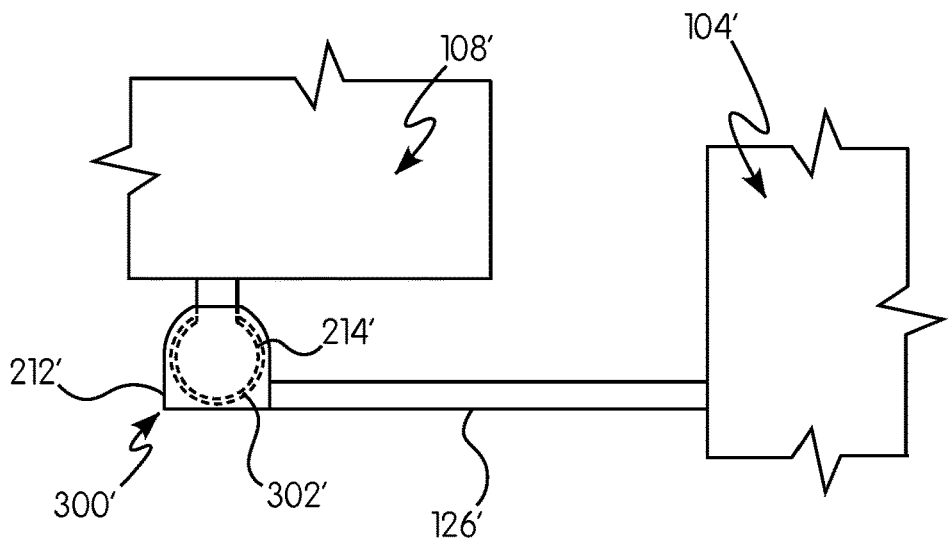
FIG. 3B is a partial front view of a receiving member and a rounded head in accordance with an alternate embodiment of an aspect of the exemplary embodiment of the present invention.
Figure 3C:
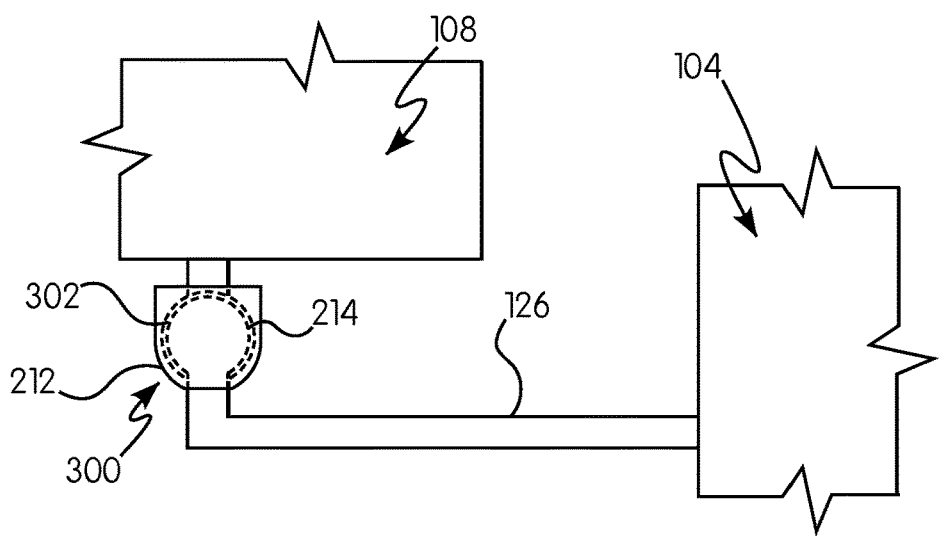
FIG. 3C is a partial front view of a receiving member and a rounded head in accordance with an aspect of the exemplary embodiment of the present invention.
Figure 4:
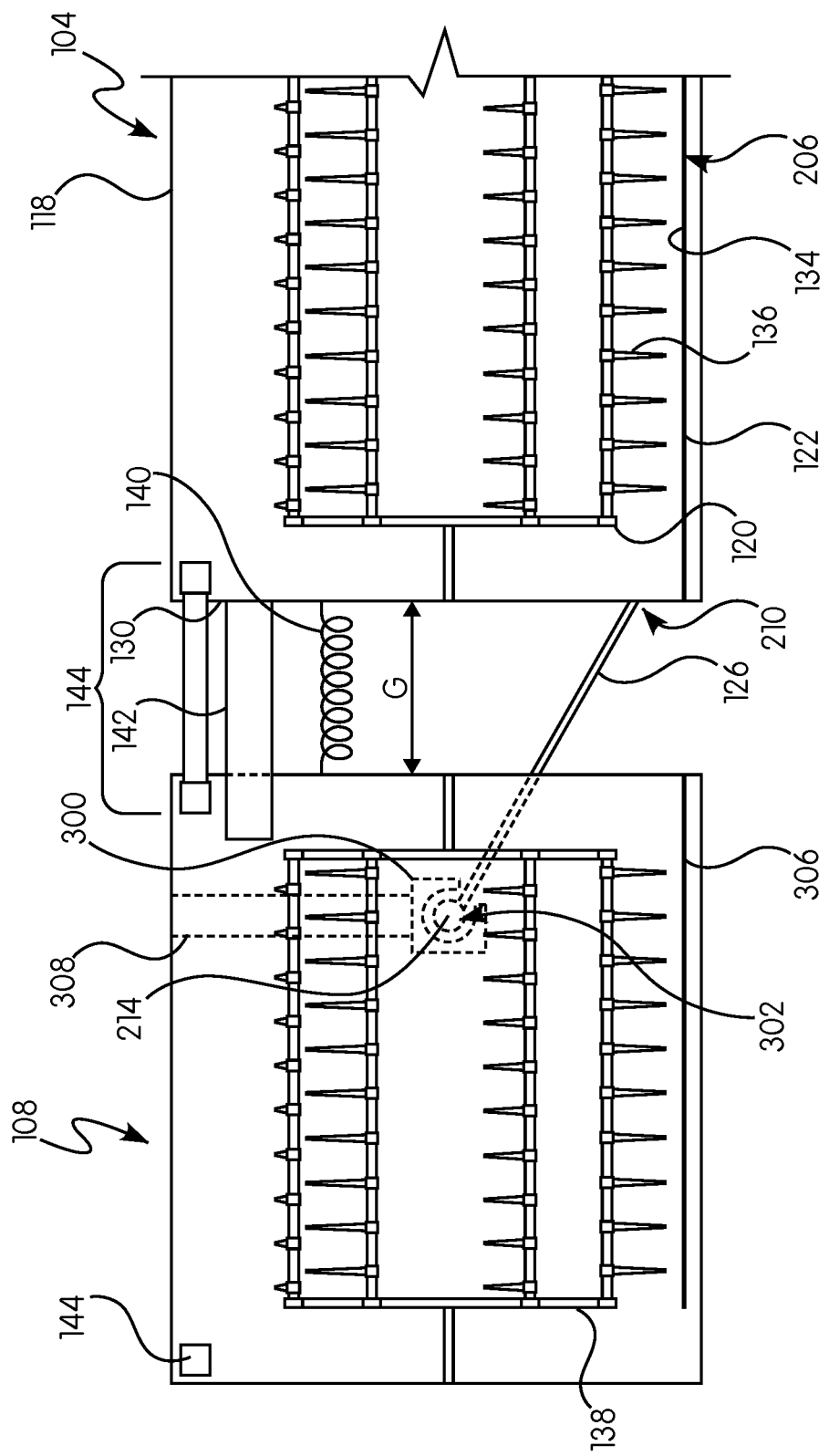
FIG. 4 is a front schematic view of a first and second frame assembly of the header of FIG. 1 in accordance with an aspect of the exemplary embodiment of the present invention.
Figure 4A:
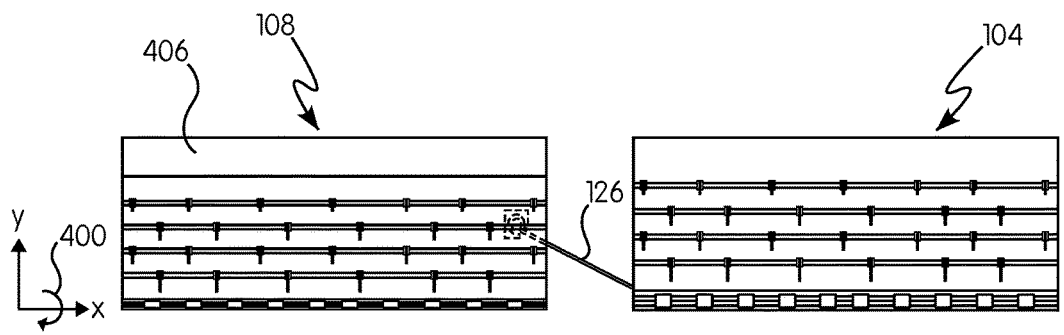
FIG. 4A is a front simplified view of a second frame assembly having rolling motion with respect to a first frame assembly.
Figure 4B:
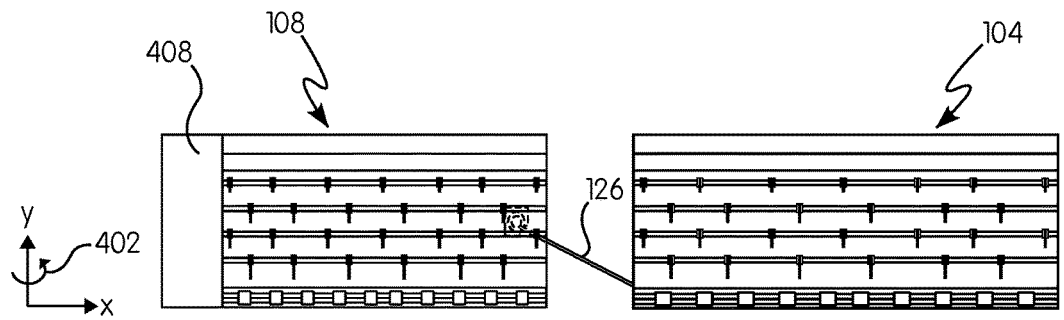
FIG. 4B is a front simplified view of a second frame assembly having yawing motion with respect to a first frame assembly.
Figure 4C:
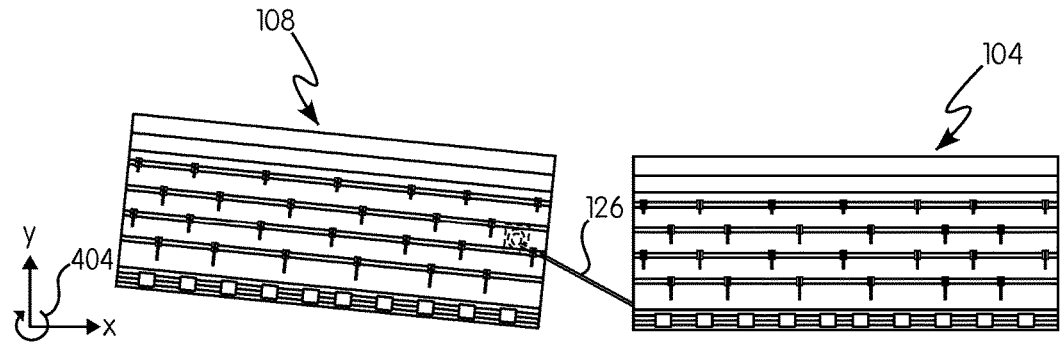
FIG. 4C is a front simplified view of a second frame assembly having pitching motion with respect to a first frame assembly.

The receiving member 300 is configured substantially as shown in FIGS. 3, 3A, 3C and 4. Specifically, the receiving member 300 is attached to the frame 308 of the second frame assembly 108 and configured to engage the distal end 212 and form a pivoting connection between the first and second frame assemblies 104, 108. In an exemplary embodiment, the receiving member 300 is located substantially centrally on an outer surface of the second frame assembly 108, and more specifically, e.g., on a bottom surface a floor of the second frame assembly 108, such that the second frame assembly 108 can freely pivot about the distal end 212 in three rotational degrees of freedom relative to the first frame assembly 104, as shown in FIGS. 4A-4C. In other words, as shown in FIGS. 3-5, the receiving member 300 is located away from the sides of the second frame assembly 108, i.e., substantially near or about a center of the second frame assembly 108. In an exemplary embodiment, the receiving member 300 is within a first one third or one quarter of a width of the second frame assembly 108 closest to the first frame assembly 104.

In the exemplary embodiment, the receiving member 300 includes a concave cavity 302, i.e., a female joint, which is arcuate in shape and configured to receive the rounded head 214. Additionally, the concave cavity 302 may also include an inner concave bearing 304 for engaging the rounded head 214. The inner concave bearing 304 can be a roller bearing or an intermediate layer for facilitating pivoting motion thereabout. An exemplary combination of the rounded head 214 and receiving member 300 is shown in FIG. 3C. However, it is appreciated that, as shown in FIG. 3B as another exemplary embodiment, a first frame assembly 104' may have a support member 126' having a distal end 212' with a receiving member 300' including a concave cavity 302' and a second frame assembly 108' may have a rounded head 214' extending therefrom for creating the pivoting connection.

In other words, the first frame assembly 104 includes one of a male joint member and a female joint member, and the second frame assembly 108 includes the other of the male joint member and the female joint member. The male and female joint members connect the second frame assembly 108 to the first frame assembly 104. Additionally, the male joint member is a rounded head 214 and the female joint member is a concave cavity 302. Therefore, the first frame assembly 104 is connected to the second frame assembly 108 via a ball and socket joint. Furthermore, the first frame assembly 104 includes one of a male joint member and a female joint member, and the third frame assembly 112 includes the other of the male joint member and the female joint member. The male and female joint members connect the third frame assembly 112 to the first frame assembly 104.

As shown in FIGS. 4A-4C, it can be appreciated, therefore, that the above described structure permits the second and third frame assemblies 104, 108, 112 free rotational/pivoting motion about the rounded head 214 in a roll 400, yaw 402 and pitch 404 direction. Specifically, FIG. 4A shows a front view of the first and second frame assemblies 104, 108 with the second frame assembly 108 having rolling motion 400. In this example, the second frame assembly 108 can be rotated about an x-axis, i.e., in the rolling direction 400, about the ball joint, i.e., the concave cavity 302 and rounded head 214 combination, such that a top side surface 406 of the second frame assembly 108 is visible. FIG. 4B shows a front view of the first and second frame assemblies 104, 108 with the second frame assembly 108 having yawing motion 402. In this example, the second frame assembly 108 can be rotated about a y-axis, i.e., in the yawing direction 402, about the ball joint such that a left side surface 408 of the second frame assembly 108 is visible. FIG. 4C shows a front view of the first and second frame assemblies 104, 108 with the second frame assembly 108 having pitching motion 404. In this example, the second frame assembly 108 can be rotated about a z-axis, i.e., the pitching direction 404, about the ball joint. It is appreciated that the second frame assembly 108 can engage in rolling 400, yawing 402 and pitching 404 motion simultaneously or in any combination thereof.

Therefore, referring now to FIGS. 1-4C, the header 102 additionally includes biasing members 140 for limiting the pivoting motion of the second and third frame assemblies 108, 112, stop members 142 for stopping the pivoting motion of the second and third frame assemblies 108, 112, and actuators 144 for adjusting a position of the first, second and/or third frame assemblies 104, 108, 112 with respect to the harvester 100.

The biasing members 140 extend from the first frame assembly 104 and connect to the second and/or third frame assembly 108, 112. The biasing members 140 are configured to provide an opposing force to a pivoting direction of the second and/or third frame assemblies 108, 112. The biasing members 140 include elongated members capable of providing a reactionary force opposite to motion via, e.g., springs, straps, or other methods well known in the art. It is appreciated that the biasing members 140 can extend directly from the frame 118 of the first frame assembly 104, e.g., the first and second side edges 130, 132, or may extend off a member connected to the first frame assembly 104 or harvester 100. In other words, the header 102 further comprises a biasing member 140 that limits a movement of the second frame assembly 108 relative to the first frame assembly 104 about one rotational degree of freedom.

Similarly, the stop members 142 extend from a side i.e., the first or second side edge 130, 132, of the first frame assembly 104, and toward the second and/or third frame assembly 108, 112. In other words, the stop member 142 extends laterally from the first frame assembly 104. In an exemplary embodiment, the stop member 142 extends in a direction substantially transverse to the pivoting motion direction of the second and/or third assemblies 108, 112. The stop members 142 are configured to provide a barrier, i.e., a stopping force, to limit the second and/or third frame assemblies 108, 112 pivoting motion between a first position/orientation and a second position/orientation. The stopping members 142 include elongated members made out of, for example, steel. In other words, the header 102 further comprises a stop member 142 that limits a rotational movement of the second frame assembly 108 between a first position and a second position.

It is appreciated that any number and combination of biasing members 140 and/or stopping members 142 can be used to limit the pivoting motion of the second and third frame assemblies 108, 112.

The actuators 144 are configured to move the first, second and third frame assemblies 108, 112 between first and second positions. Additionally, the actuators 144 are configured to maintain the first, second and third frame assemblies 108, 112 in specified orientations by, e.g., counterbalancing the assemblies as they pivot in a direction. In the exemplary embodiment, each of the first, second and third frame assemblies 108, 112 include an actuator 144, such that each of the frame assemblies 108, 112 can be individually moved between the first and second positions. The actuators 144 are configured to move the first, second and third assemblies 104, 108, 112 in one of the roll 400, yaw 402 and pitch 404 directions. Additionally, the actuators 144 on the first frame assembly 104 are configured to provide translational motion e.g., lifting, to the first frame assembly 104. In the exemplary embodiment, the actuators 144 are hydraulic cylinders. Such actuators 144 are well known in the art and do not necessitate additional discussion for the purposes of the present embodiments.

Additionally, it is appreciated that the position of the actuators 144 in FIGS. 1-4 are for exemplary purposes only. For example, one set of actuators is 144, as shown in FIG. 1, is positioned between the first and second frame assemblies 104, 108 and between the first and third frame assemblies 104, 112 for pivoting the second and third frame assemblies 108, 112 in the yaw 402 direction. Such pivoting motion is accomplished by pushing the second and/or third frame assemblies 108, 112 off center from the point of rotation, i.e., the rounded head 214 and receiving member 300. It is appreciated that the actuators 144 can be positioned on other parts of the frames 118 of the first, second and third frame assemblies 108, 112 to generate motion in the rolling, 400 and pitching 404 directions.

Furthermore, as another example, the actuators 144 can be positioned below the floors of the assemblies 104, 108, 112, e.g., attached to the wheels supporting the assemblies off the ground, to provide translational motion, e.g., lifting, to the assemblies. It is appreciated that in such an arrangement, the assemblies 104, 108, 112 can be independently lifted and adjusted so long as the dimensions of the support members 126 and receiving member 300 allow such movements without breaking or separating. Exceeding those dimensions, however, the assemblies 104, 108, 112 will be, e.g., lifted substantially in unison.

It is appreciated that to effectuate rotational and translational motion provided by the actuators 144 or the movement of the header 102 over the crop field, the support members 126 may also include additional features, such as extendable members, pivoting connections to the first frame assembly, and so forth.

In other words, the header 102 further comprises a first actuator 144 engaging the first frame assembly 104 for moving the first frame assembly between a first position and a second position. The header 102 further comprises a second actuator 144 engaging the second frame assembly 108 for moving the second frame assembly 108 between a first position and a second position. The second actuator 144 pivots the second frame assembly 108 relative to the first frame assembly 104 between the first and second positions in one of a roll 400, yaw 402 and pitch 404 direction. Additionally, the header 102 further comprises a third actuator 144 engaging the third frame assembly 112 for moving the third frame assembly 112 between a first position and a second position. The third actuator 144 pivots the third frame assembly 112 relative to the first frame assembly 104 between the first and second positions in one of a roll 400, yaw 402 and pitch 404 direction.

Referring now to FIGS. 1-4C, the first frame assembly 104 of the header 102 is operatively connected to the harvester 100. The second and third frame assemblies 108, 112 are pivotally connected to the first frame assembly 104 via the laterally extending first and second support members 126, 128, and, more specifically, via the rounded head 214 and the concave cavity 302 of the receiving member 300. The first and second lateral draper belts 122, 124 extend up to the edges 130, 132 of the first frame assembly 104. The second and third frame assemblies 108, 112 have a similar draper belt 306 configured to feed towards the first and second lateral draper belts 122, 124 and over the gap G between the first and second and third frame assemblies 104, 108, 112. Alternatively, the first and second lateral draper belts 122, 124 can extend between the first and second frame assemblies 104, 108 and the first and third frame assemblies 104, 112, respectfully.

In the exemplary embodiment, the present invention operates by cutting crops via the first, second and third cutter bar segments 106, 110, 114 and the rotating reels 120, 138. As the harvester 100 moves forward, the second and third frame assemblies 108, 112 are able to pivot and rotate along the ground to accommodate changes in, e.g., elevation and/or terrain, in three rotational degrees of freedom. Consequently, the second and third cutter bar segments 110, 114 are able to more effectively cut crops. As the crops are cut, the crops are transported to the harvester 100 via the lateral draper belts 122, 124, 306 the infeed draper belts 200, 202, the rotatable auger 204 and the feederhouse 116. In an exemplary embodiment, the gap G between the first and second and third frame assemblies 104, 108, 112 is minimal such that the crop can effectively transition from the lateral draper belt 306 of the second and third frame assemblies 108, 112 to the lateral draper belts 122, 124 of the first frame assembly 104.

In other words, the second frame assembly 108 is movable about the first point, i.e., the distal end 212 of the first support member 126, in three rotational degrees of freedom relative to the first frame assembly 104. Alternatively, the second frame assembly 108 is movable relative to the first frame assembly 104 in only three rotational degrees of freedom. Additionally, the third frame assembly 112 is movable about the second point, i.e., the distal end of the second support member 128, in three rotational degrees of freedom relative to the first frame assembly 104.

The advantages of a header having multiple frame assemblies, i.e., a multi-sectional header, capable of having its outer sections freely pivot are apparent. Specifically, the larger headers become, the more ground they cover. Consequently, it is often the case that crops located on one end of the header may be at a different elevation level than at the other end of the header, leading to loss of crops on one or both ends of the header. By having a sectional header that allows its sections to pivot and flex independently from one another to accommodate the changes in terrain, the crops can be more efficiently collected.

While the present invention has been described with reference to exemplary embodiments, it will be appreciated by those skilled in the art that various changes may be made and equivalents may be substituted for elements thereof without departing from the scope of the present invention. For example, features described in one embodiment may be incorporated into a different embodiment, such as the use of stopping members and actuators.

In addition, modifications may be made to adapt a particular situation or material to the teachings of the present invention without departing from the essential scope thereof. For example, the header can include a different arrangement of draper belts, rotatable augers and rotatable reels. It is to be understood, therefore, that the present invention not be limited to the particular aspects disclosed, but it is intended to cover modifications within the spirit and scope of the present invention as defined by the appended claims.

We claim:

1. A header for an agricultural harvester comprising:
   a first frame assembly supporting a first substantially linear cutter bar segment extending widthwise about a forward end of the first frame assembly, the first frame assembly extending widthwise across the header; and
   a second frame assembly supporting a second cutter bar segment, wherein the second frame assembly is connected to the first frame assembly via a joint positioned below a floor of the second frame assembly, and movable relative to the first frame assembly about three rotational degrees of freedom.

2. The header of claim 1, wherein the second frame assembly is connected to the first frame assembly about a first point spaced laterally away from and below the first frame assembly.

3. The header of claim 1, wherein the second frame assembly is movable relative to the first frame assembly in only three rotational degrees of freedom.

4. The header of claim 1, further comprising a biasing member that limits a movement of the second frame assembly relative to the first frame assembly about one rotational degree of freedom.

5. The header of claim 1, further comprising a stop member extending from a side of the first frame assembly toward the second frame assembly and terminating at a position substantially adjacent the second frame assembly that limits a rotational movement of the second frame assembly between a first position and a second position.

6. The header of claim 5, wherein the stop member extends laterally from the first frame assembly.

7. The header of claim 1, wherein the joint includes one of a male joint member and a female joint member directly connected to the first frame assembly, and the other of the male joint member and the female joint member is directly connected to the second frame assembly.

8. The header of claim 1, wherein the joint is a ball and socket joint.

9. The header of claim 1, wherein the first frame assembly includes a laterally extending first support member that includes a pivoting connection that connects the second frame assembly to the first frame assembly.

10. The header of claim 1, further comprising a first actuator engaging the first frame assembly for moving the first frame assembly between a first position and a second position.

11. The header of claim 1, further comprising a second actuator engaging the second frame assembly for moving the second frame assembly between a first position and a second position.

12. The header of claim 11, wherein the second actuator pivots the second frame assembly relative to the first frame assembly between the first and second positions in one of a roll, yaw and pitch directions.

13. The header of claim 1, further comprising a third frame assembly supporting a third cutter bar segment, wherein the third frame assembly is connected to the first frame assembly via a second joint positioned below a floor of the third frame assembly, and movable relative to the first frame assembly about three rotational degrees of freedom.

14. The header of claim 13, wherein the joint includes one of a male joint member and a female joint member directly connected to the first frame assembly, and the other of the male joint member and the female joint member is directly connected to the third frame assembly.

15. The header of claim 13, wherein the first frame assembly includes a laterally extending second support member that includes a pivoting connection that connects the third frame assembly to the first frame assembly.

16. The header of claim 13, further comprising a third actuator engaging the third frame assembly for moving the third frame assembly between a first position and a second position.

17. The header of claim 16, wherein the third actuator pivots the third frame assembly relative to the first frame assembly between the first and second positions in one of a roll, yaw and pitch directions.

18. The header of claim 1, further comprising a conveyor on at least one of the first and second frame assemblies for delivering cut crop to a feederhouse of the agricultural harvester.

19. The header of claim 4, wherein the biasing member extends from the first frame assembly and is connected to the second frame assembly.

20. A header for an agricultural harvester comprising:
   a first frame assembly supporting a first substantially linear cutter bar segment extending widthwise about a forward end of the first frame assembly, the first frame assembly extending widthwise across the header;
   a second frame assembly supporting a second cutter bar segment and movable relative to the first frame assembly about three rotational degrees of freedom;
   a joint positioned about a central portion of the second frame assembly connected to the first frame assembly and the second frame assembly for moving the second frame assembly about three rotational degrees of freedom;
   an elastic biasing member between the first frame assembly and the second frame assembly for limiting movement between the first frame assembly and the second frame assembly;
   a stop member extending between the first frame assembly and the second frame assembly for stopping movement between the first frame assembly and the second frame assembly; and
   at least one actuator operatively connected to at least one of the first frame assembly and the second frame assembly for adjusting a position of the at least one of the first frame assembly and the second frame assembly.

* * * * *